(12) United States Patent (10) Patent No.: US 12,617,233 B2
Goebel (45) Date of Patent: May 5, 2026

(54) BICYCLE WHEEL HUB

(71) Applicant: SRAM Deutschland GmbH,
Schweinfurt (DE)

(72) Inventor: Joachim Goebel, Prosselsheim (DE)

(73) Assignee: SRAM DEUTSCHLAND GmbH,
Schweinfurt (DE)

( * ) Notice: Subject to any disclaimer, the term of this
patent is extended or adjusted under 35
U.S.C. 154(b) by 337 days.

(21) Appl. No.: 17/503,240

(22) Filed: Oct. 15, 2021

(65) Prior Publication Data

US 2022/0032686 A1     Feb. 3, 2022

(30)     Foreign Application Priority Data

Oct. 16, 2020     (DE) ..................... 10 2020 127 381.9

(51) Int. Cl.
B60B 27/04     (2006.01)
B60B 27/02     (2006.01)
F16D 41/24     (2006.01)
(52) U.S. Cl.
CPC .......... B60B 27/047 (2013.01); B60B 27/023
(2013.01); F16D 41/24 (2013.01)
(58) Field of Classification Search
CPC ..... B60B 27/023; B60B 27/047; F16D 41/24;
F16D 41/36; B60Y 2200/13
USPC ........................................................ 301/6.5
See application file for complete search history.

(56)     References Cited

U.S. PATENT DOCUMENTS 3,754,412  A  *   8/1973  Briggs ...................... F16D 7/08
                                                     192/56.62
4,116,319  A  *   9/1978  Nagano .................... B62M 9/10
                                                     192/64
5,964,332  A  * 10/1999  King ..................... B60B 27/023
                                                     192/64
7,044,564  B2 *  5/2006  Chen ................... B60B 27/0005
                                                     192/64

(Continued)

FOREIGN PATENT DOCUMENTS

DE        1984773  U1    5/1968
DE      20213259  U1 *  11/2002   ............. B60G 11/52

(Continued)

OTHER PUBLICATIONS

Getner, Sylomer Data Sheet, https://www.getzner.com/en/products/
sylomer wayback machine snapshot from Aug. 24, 2018 (Year:
2018).*

*Primary Examiner* — S. Joseph Morano
*Assistant Examiner* — Eva L Comino

(57)     ABSTRACT

A freewheel hub for a bicycle is presented. The freewheel
hub may include a hub axle, a hub sleeve which is mounted
rotatably on the hub axle, and a driver which is mounted
rotatably on the hub axle and can be connected to at least one
sprocket arrangement. A freewheel device may be arranged
between the hub sleeve and the driver. The free wheel device
may include a first clutch ring, which is coupled or couplable
to the hub sleeve in a torque-transmitting manner, a second
clutch ring, which is coupled or couplable to the driver in a
torque-transmitting manner. The two clutch rings have
mutually facing axial toothings and a preload device which
is designed and arranged to preload the two clutch rings
axially towards one another, wherein the preload device has
a spring arrangement with at least one spring element made
of a plastic with a cellular structure.

14 Claims, 6 Drawing Sheets

(56)            References Cited

U.S. PATENT DOCUMENTS

| | | | | | |
|---|---|---|---|---|---|
| 9,181,994 | B2 * | 11/2015 | Braedt | ................. | B60B 27/023 |
| 9,199,509 | B2 * | 12/2015 | Koshiyama | ........... | B60B 27/047 |
| 10,370,993 | B2 * | 8/2019 | Davis | .................... | F16J 15/104 |
| 2017/0246904 | A1 * | 8/2017 | Emura | .................... | F16D 41/24 |

FOREIGN PATENT DOCUMENTS

| | | | | | |
|---|---|---|---|---|---|
| DE | 102012020472 | | 4/2014 | | |
| DE | 202014001591 | U1 * | 5/2014 | ......... | B60B 27/0005 |
| DE | 102009010258 | B4 * | 7/2015 | ........... | B60B 27/023 |
| DE | 102015009143 | | 1/2017 | | |
| DE | 102016010853 | A1 * | 4/2017 | ......... | B60B 27/0026 |
| EP | 0238613 | * | 3/1990 | ................ | F16F 7/14 |
| EP | 1503104-1 | * | 1/2006 | ........... | F16D 13/70 |
| EP | 3275693 | A1 * | 1/2018 | ........... | B60B 27/001 |
| EP | 3590815 | | 1/2020 | | |
| EP | 3590815 | A1 * | 1/2020 | ......... | B60B 27/0031 |
| JP | 2677551 | B2 * | 11/1997 | ............ | B60K 23/08 |
| JP | 3712887 | B2 * | 11/2005 | ................ | F16F 1/16 |
| RU | 2648779 | C1 * | 3/2018 | | |
| WO | WO-9209820 | A1 * | 6/1992 | ........... | F16D 41/061 |
| WO | WO-2015010190 | A1 * | 1/2015 | ............ | F16F 15/123 |

* cited by examiner

BICYCLE WHEEL HUB

This application claims priority to, and/or the benefit of, German patent application DE 10 2020 127 381.9 filed Oct. 16, 2020, the contents of which are incorporated herein in their entirety.

FIELD OF INVENTION

The present invention relates to a freewheel hub for a bicycle that comprises a hub axle, a hub sleeve which is mounted rotatably on the hub axle, a driver which is mounted rotatably on the hub axle and can be connected to at least one sprocket arrangement, and also a freewheel device which is arranged between the hub sleeve and the driver

BACKGROUND

An A freewheel hub is known from the document DE 198 47 73 A1, for example. Said document describes a freewheel hub in which the preload device is formed by two helical compression springs made of steel.

Owing to manufacturing-related restrictions in the production of steel springs, in particular in terms of the winding ratio, said steel springs can, however, only be used for clutch rings with a limited diameter and consequently a limited number of clutch teeth. For this reason, only relatively large angles of engagement can be realized, for instance 20° to 15°. It is also the case that the forces acting on the clutch teeth are relatively large on account of the limited diameter, this leading to rapid wear. Furthermore, the operating noises in the case of freewheels with steel springs are generally very loud.

As an alternative, freewheel hubs with magnetic preload devices are known, for example from DE 10 2015 009 143 A1.

However, these have a considerably more complex and thus more cost-intensive structure and require high precision and narrow tolerances in comparison with the freewheel hubs with mechanical preload devices.

Moreover, the force applied to the clutch rings by the magnets is not distributed uniformly around the circumference of the hub axle, but acts in a very punctiform manner. At relatively high speeds and in particular during fast suspension deflection movements of the rear wheel on a full-suspension bicycle (MTB fully), the clutch rings start to perform oscillating movements, the result of which is that sometimes only individual teeth of the axial toothings engage, causing them to become damaged. As the operating time increases, this can continue up to the total failure of the entire freewheel.

SUMMARY

In an embodiment, a freewheel hub for a bicycle is presented. The freewheel hub may include a hub axle, a hub sleeve which is mounted rotatably on the hub axle, and a driver which is mounted rotatably on the hub axle and can be connected to at least one sprocket arrangement. A freewheel device may be arranged between the hub sleeve and the driver. The free wheel device may include a first clutch ring, which is coupled or couplable to the hub sleeve in a torque-transmitting manner, a second clutch ring, which is coupled or couplable to the driver in a torque-transmitting manner. The two clutch rings have mutually facing axial toothings and a preload device which is designed and arranged to preload the two clutch rings axially towards one another, wherein the preload device has a spring arrangement with at least one spring element made of a plastic with a cellular structure.

BRIEF DESCRIPTION OF THE DRAWINGS

The invention will be discussed in more detail below on the basis of embodiments and with reference to the appended drawings, in which.

DETAILED DESCRIPTION OF THE DRAWINGS

Figure 1:
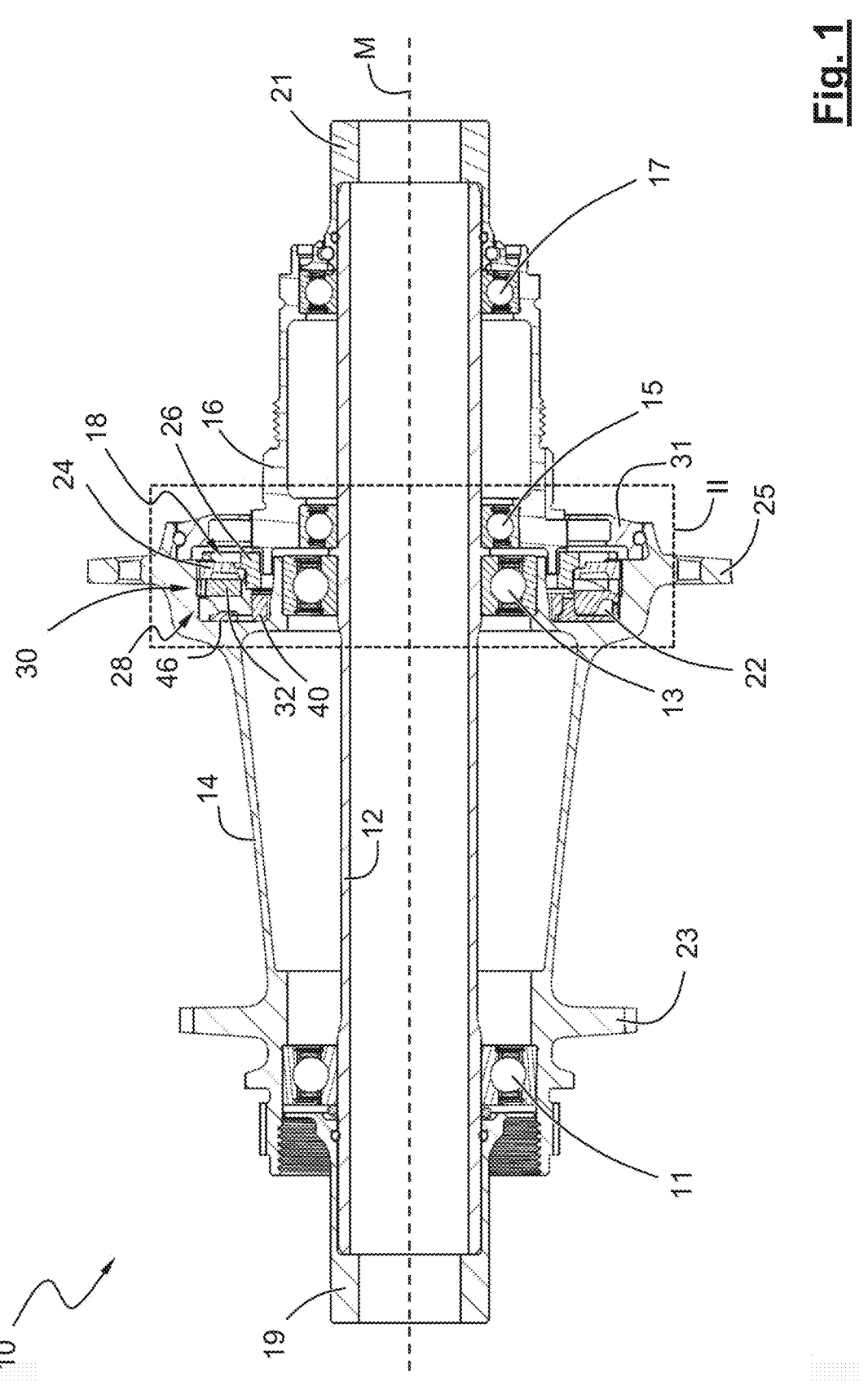
FIG. 1 shows a first exemplary embodiment of a freewheel in a longitudinal sectional view.

A freewheel device may include a first clutch ring, which is coupled or couplable to the hub sleeve in a torque-transmitting manner, and a second clutch ring, which is coupled or couplable to the driver in a torque-transmitting manner, wherein the two clutch rings have mutually facing axial toothings. Furthermore, the freewheel device may include a preload device which is designed and arranged to preload the two clutch rings axially towards one another, wherein the preload device has a spring arrangement with at least one spring element.

A freewheel of this type is also referred to as an axial freewheel or ratchet freewheel.

Against this background, an object of the present invention is to improve the freewheel hub in terms of wear, operating noise and production outlay.

For this purpose, it is proposed to use, instead of a steel spring, a spring element made of a plastic with a cellular structure, in particular based on polyurethane, preferably a mixed-cell polyurethane elastomer.

A technical foam may be used, for example, as sold under the designation Cellasto® by BASF or under the designation Sylomer® by Getzner. Prototypes of the springs have been manufactured from Sylomer® of SR28 type, for example.

Polyurethanes are grease- and oil-resistant, temperature-independent, and cost-effective to produce and on account of this are very well suited for use as springs in axial freewheels.

Larger clutch diameters can be realized in comparison with spring engagements with springs made of steel, the result of which is smaller angles of engagement and lower forces. The wear is reduced and the operating duration is correspondingly increased. The damping properties of the material moreover bring about a noise reduction during operation.

In comparison with the magnetic freewheel, the spring engagement can be applied more uniformly to the planar surface of the clutch ring(s).

Furthermore, the structure of the freewheel according to an embodiment is very simple, does not require high precision or narrow tolerances and can therefore be produced cost-effectively. The spring elements, described in more detail below, can be produced very easily from prefabricated sheet material, for example by means of water jet cutting.

In comparison with the magnetic freewheel, in which a complex post-machining of the clutch rings and the hub sleeve is necessary in order to be able to suitably position the individual magnets, the manufacturing outlay of the freewheel is considerably reduced overall.

For a uniform distribution of the spring force, it may be provided that the spring arrangement comprises a plurality of spring elements, preferably of the same type, which are arranged distributed around the circumference of the hub axle, preferably at the same angular spacings from one another in each case.

It is preferably provided that the spring element or each of the spring elements has an arcuate portion, the convex side of which is configured to press against one of the clutch rings in the axial direction, in order to preload the two clutch rings towards one another when the spring element is installed in the freewheel hub.

According to a preferred exemplary embodiment, in this respect the arcuate portion is in the form of a strip portion with substantially constant width and thickness. Structures of this type may particularly easily be cut out of a flat foam sheet, for instance by water-jet cutting. In this respect, the width direction of the strip portion may correspond to the thickness of the sheet.

Further, the arcuate portion is preferably curved about an axis which runs approximately parallel to the width direction of the strip portion and/or approximately radially in the installed state.

In this respect, the resulting spring force is influenced on the one hand by material-dependent factors, that is to say by the type of the plastic and the shape and size of the pores, for example, and on the other hand by geometry-dependent factors, for instance by the arc shape, arc radius and strip thickness, inter alia, in the case of an arcuate portion. A suitable combination of these factors makes it possible to set the desired spring force in a simple manner.

Only relatively low axial resetting forces are required for the function of the freewheel. For the preloading, 0.2 to 0.5 N is required, for example, and during operation of the freewheel about 1 N is required.

It has been found that such low resetting forces can be achieved by virtue of a combination of cellular material and suitable geometry of the spring elements, this moreover advantageously resulting in a reduction of the operating noises.

This applies in particular when the spring arrangement is designed such that primarily the flexural rigidity, and to a lesser extent a compression of the plastic, generates the spring forces required for the freewheel. In other words, the spring arrangement is preferably designed such that, although the spring arrangement is deformed when a contact pressure of 0.2 N to 0.5 N is applied thereto in the axial direction, the cellular structure of the plastic is not significantly compressed in the process.

Without wishing to commit to this, it is assumed that the cellular structure of the plastic reduces the flexural rigidity of the spring elements in a suitable way.

A particularly flexible use of the spring elements, for instance for clutch rings with different diameters, is enabled if the spring arrangement is formed from a plurality of separately formed spring elements of the same type.

In this respect, each spring element may be in the form of a D ring or formed in the shape of an arc with angled-away longitudinal ends. Other shapes are also conceivable, for instance rectangular or angular, provided that they permit the installed spring element to bend and/or reset in the axial direction.

In order to establish the installation position of the individual spring elements, it is preferred in this respect for them to be inserted into corresponding depressions, wherein these depressions are formed in an axial surface, that is to say a surface with an axial normal vector, of the hub sleeve or the driver. Other fixing possibilities are also conceivable. The individual spring elements could be placed into a circumferential groove of the hub sleeve or the driver, for example, in which circumferential groove suitable stops are provided, between which the spring elements can be clamped in.

The assembly outlay can be considerably reduced by connecting the plurality of spring elements to one another in one piece and preferably in the form of a cohesive strip which forms the spring arrangement.

Since the plastics material used is sufficiently flexible, the strip may first be cut out of a flat sheet with a fixed number of arcuate portions connected to one another by planar portions and then, for example by hand, bent around the hub axle and placed into a corresponding circular groove, which is provided in an axial surface of the hub sleeve or driver.

In this respect, it should be taken into consideration that the strip should be placed in such that it does not undesirably deform during operation. For this purpose, corresponding structures, for instance stops or projections, may be provided in the hub sleeve or the driver.

A correct installation of the preload device may be easily ensured and/or simplified in that the preload device also has a retaining ring, which is designed to fix the positions of the individual spring elements relative to one another. The retaining ring is preferably manufactured from a plastic and may be designed for one cohesive strip with a plurality of spring elements or for separate spring elements.

According to one preferred exemplary embodiment, it is provided that the retaining ring comprises an annular base and a plurality of retaining elements which are distributed around the circumference of the base, protrude radially from said base, cover the spring arrangement axially on one side in certain portions and preferably engage around the spring arrangement radially from the inside and outside.

This design presents itself in particular for the above-described strip with arcuate portions and planar portions arranged in an alternating manner, which strip can be placed into the retaining ring such that the retaining elements each cover and/or engage around the planar portions.

In addition, it may be provided that the preload device also comprises a cover ring, which can be mounted on the retaining ring such that the spring arrangement is received at least in certain portions, in particular in the region of the planar portions, between the retaining ring and the cover ring and, together with the retaining ring and the cover ring, forms a solidly cohesive assembly. In this way, the spring arrangement is prevented from falling out of the retaining ring, and the preload device can particularly easily be handled as a replacement part.

Finally, protection is also claimed for a preload device for a freewheel hub as described above.

In this respect, the preload device may be formed for example by a plurality of individual, separate spring elements or by a cohesive spring arrangement, in particular in the form of a strip with an alternating arrangement of arcuate portions (as spring elements) and planar portions (as spacers), or by a spring arrangement with a retaining ring, or by a spring arrangement with a retaining ring and cover ring, wherein each individual spring element and/or the spring arrangement respectively consists of a plastics material with a cellular structure.

For reasons of clarity, reference signs are not provided for all of the features in each figure, but rather primarily only for those features that are required for explaining the respective figure. This applies in particular when a figure contains a plurality of features of the same type.

Features of the various exemplary embodiments that are the same or correspond to one another are each provided with the same reference signs, and the second and third exemplary embodiments are predominantly only explained insofar as they differ from the first exemplary embodiment, reference otherwise being made to the description thereof.

FIG. 1 shows a longitudinal sectional view of a first exemplary embodiment of a freewheel hub 10 according to an embodiment, the longitudinal axis M of which is contained in the sectional plane. In this application, unless otherwise specified, the term "axial" always refers to this longitudinal axis M, which coincides with the rear-wheel axle of the bicycle in the installed state.

The freewheel hub 10 comprises a hub axle 12, which can be fixed to the frame of a bicycle in a known manner. A hub sleeve 14 is mounted rotatably on the hub axle 12 via two rolling bearings 11 and 13 and a driver 16 is mounted rotatably on said hub axle via two further rolling bearings 15 and 17. In the axial direction, the hub sleeve 14 and the driver 16 are secured to the hub axle 12 via closure elements 19 and 21.

At the longitudinal end of the hub sleeve 14 that faces towards the driver 16, the hub sleeve has an encircling axial groove 22, which receives the freewheel device 18 described in more detail below. The hub sleeve 14 also has two spoke flanges 23 and 25, to which spokes can be attached in a known manner.

The driver 16 can be connected to a sprocket arrangement, not illustrated here, by way of which torque can be introduced into the driver 16 and transferred via said driver to the hub sleeve 14 and thus to the rear wheel of the bicycle.

Between the hub sleeve 14 and the driver 16, the freewheel device 18 is arranged in the groove 22 and outwardly sealed in a leaktight manner by a further closure element 31.

Figure 2:
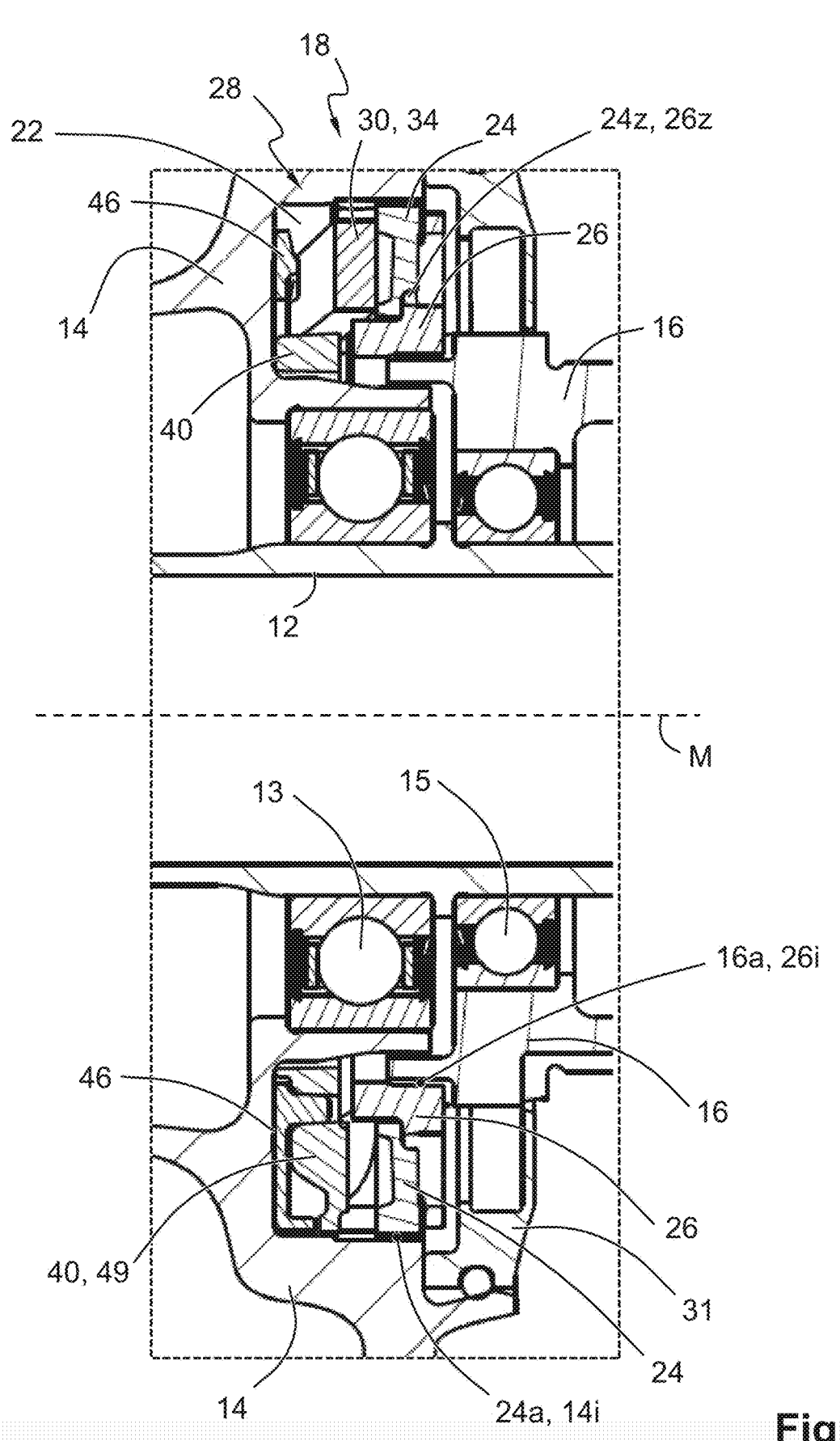
FIG. 2 shows an enlargement of a detail of the region denoted by II in FIG. 1.

The freewheel device 18 can be better seen in the enlargement of a detail illustrated in FIG. 2. Said freewheel device comprises a first clutch ring 24, a second clutch ring 26 and a preload device 28.

The first clutch ring 24 is coupled to the hub sleeve 14 in a torque-transmitting manner, and the second clutch ring 26 is coupled to the driver 26 in a torque-transmitting manner. The radial outer toothings 24a and 16a, provided on the respective components for this purpose, and inner toothings 14i and 26i, respectively, can best be seen in the perspective view in FIG. 8 of the second exemplary embodiment, but are identical for all exemplary embodiments.

To realize the freewheel, in a known manner the two clutch rings 24 and 26 also have mutually facing axial toothings 24z, 26z (cf. FIGS. 8 and 9) with oblique sliding surfaces and are preloaded axially towards one another by the preload device 28.

Apart from the specific configuration of the preload device 28, described in more detail below, the structure and the functioning of the freewheel illustrated are known. Reference is made to the two documents mentioned in the introduction, for example.

Figure 3:
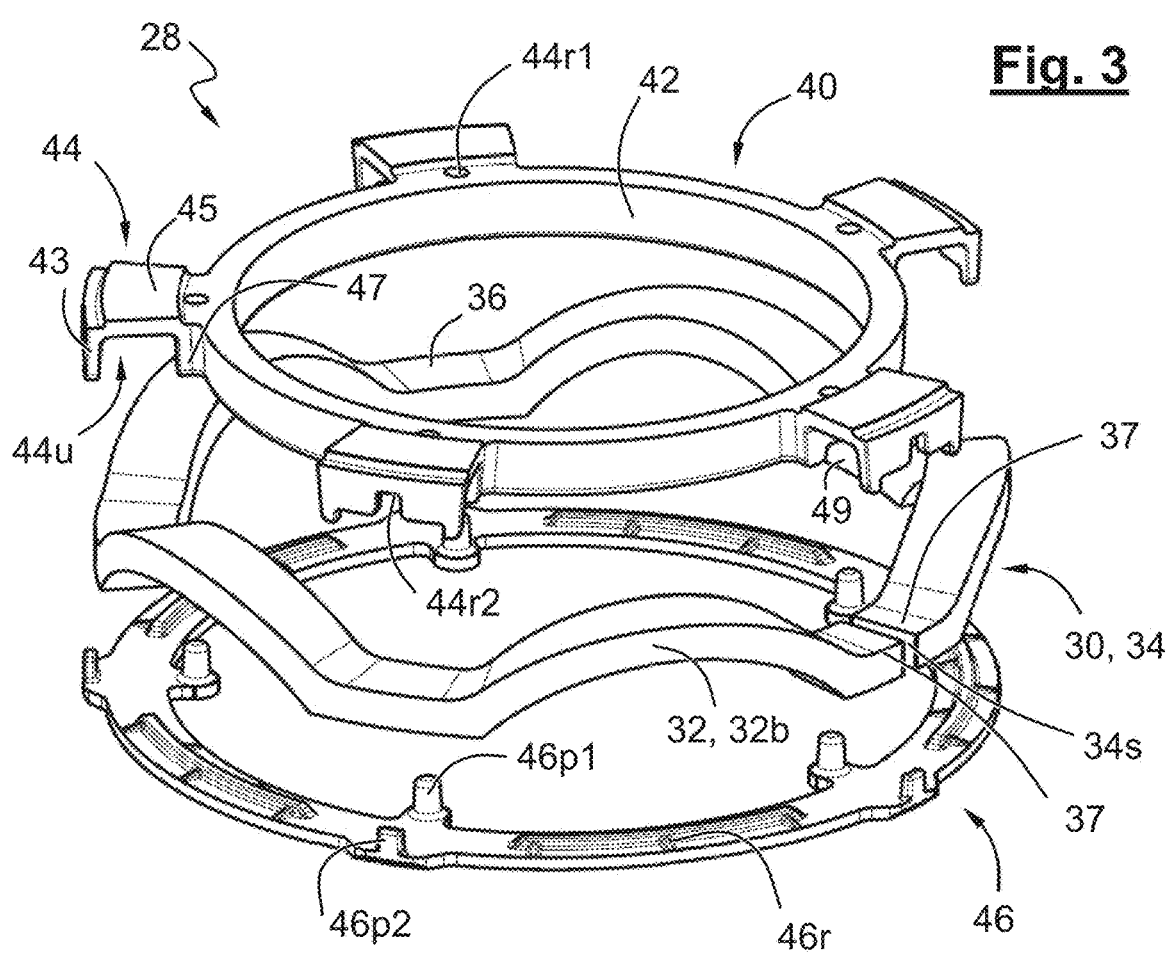
FIG. 3 shows an exploded illustration of the preload device of the freewheel hub from FIG. 1.
Figure 4:
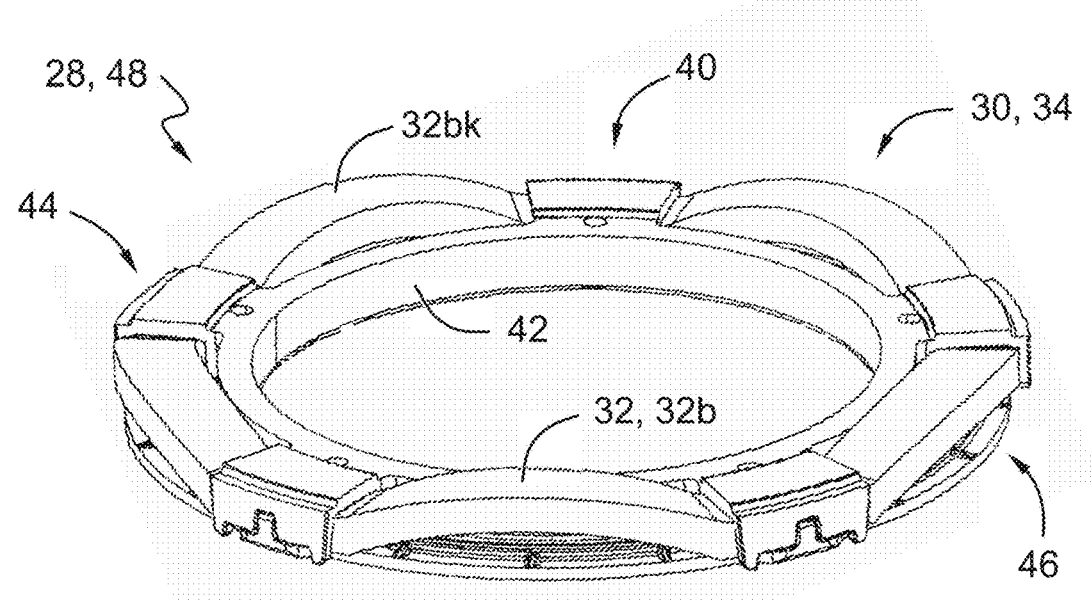
FIG. 4 shows a perspective view of the preload device from FIG. 3 in the assembled state.

In the first exemplary embodiment in FIGS. 1 to 7, the preload device 28 is formed from a spring arrangement 30, a retaining ring 40 and a cover ring 46, which are illustrated in an exploded illustration in FIG. 3 and in an assembled state in FIG. 4, in which assembled state the three above-mentioned components form a solidly cohesive assembly 48.

The spring arrangement 30 comprises a plurality of spring elements 32, which according to an embodiment consist of a plastics material with a cellular structure, for example a polyurethane-based foam.

In the first and second exemplary embodiments in FIGS. 1 to 8, the spring elements 32, which are of the same type and of which there are five in the present case, are connected to one another in one piece in the form of a cohesive strip 34. The strip 34 comprises an alternating arrangement of arcuate portions 32b of the same type, which form the actual spring elements 32, and planar portions 36 of the same type, which form spacers between the arcuate portions 32b. At the two longitudinal ends, the strip 34 also has planar end portions 37, the length of which is approximately half the length of the rest of the planar portions 36 or somewhat less.

Figures 5, 6, 7:
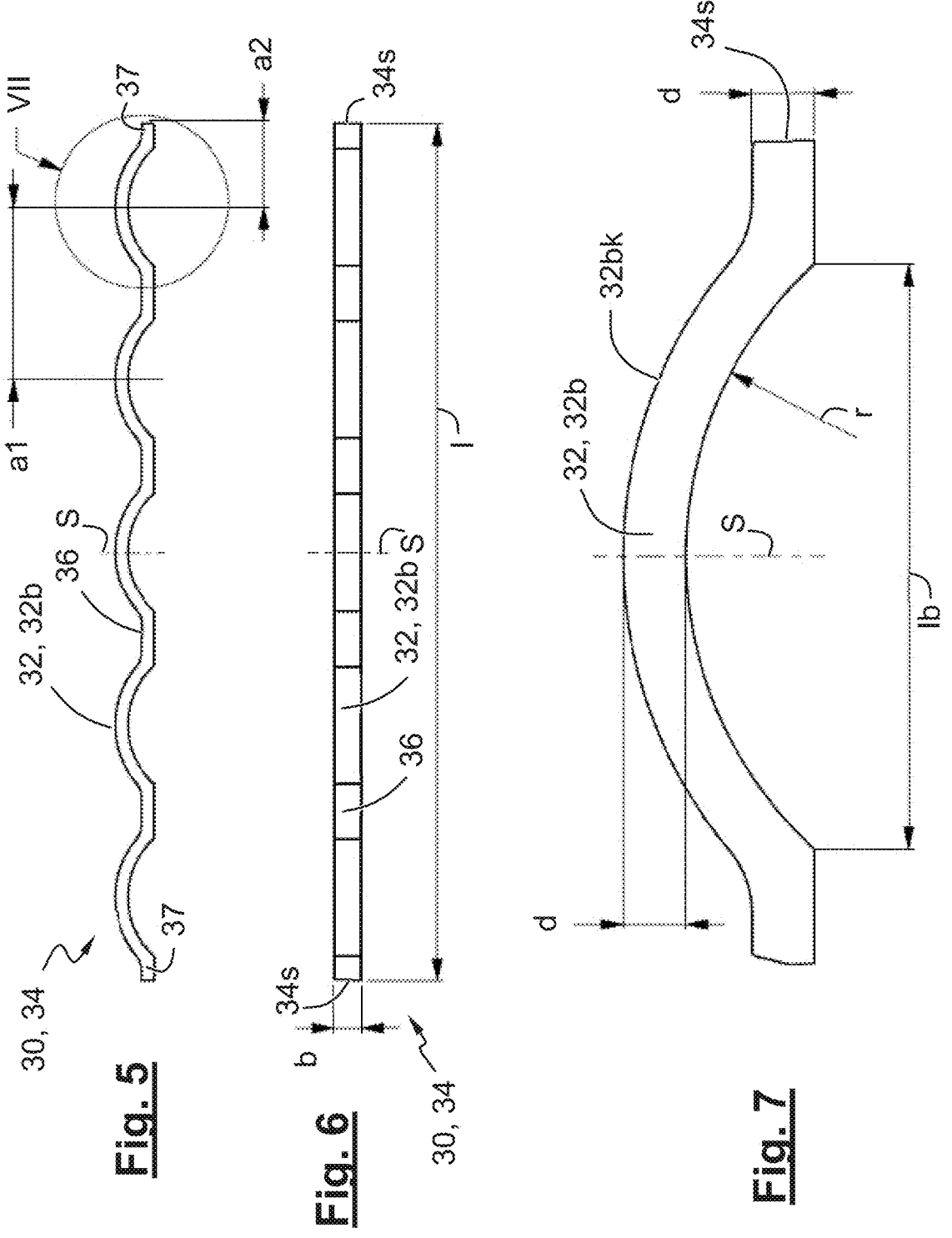
FIG. 5 shows a side view of the spring arrangement of the preload device from FIG. 3 before being placed into the retaining ring.
FIG. 6 shows a plan view of the bottom side of the subject matter of FIG. 5.
FIG. 7 shows an enlargement of a detail of the region denoted by VII in FIG. 5.

The precise shape of the strip 34, which can be cut out of a sheet-like, sufficiently flexible starting material with a cellular structure, is illustrated in various views in FIGS. 5 to 7. In the example illustrated, the shape of the strip is mirror-symmetrical with respect to a plane of symmetry S. FIGS. 5 to 7 show the strip in an initial state, before it is bent around an axis parallel to the thickness direction D of the strip.

The width b (cf. FIG. 6) of the strip 34 is preferably constant over the length of the strip and may be between 3 mm and 5 mm, for example. The width b may be given by the thickness of the sheet-like starting material, for example.

The thickness d of the strip is also preferably constant and is preferably between 1.5 mm and 2.5 mm, while its overall length l may be 135 mm to 139 mm, for instance. The inner arc radius r of the arcuate portions 32b is between 12 mm and 14 mm, for example, and the length $1b$ of the arcuate portions is between 18 mm and 20 mm, for example. The spacing a1 between the centre points of adjacent arcuate portions 32b may be between 26 mm and 29 mm, for instance, and the spacing a2 between one longitudinal end and the centre point of the directly adjacent arcuate portion may be between 13 mm and 15 mm, for instance.

The individual variables, such as overall length, width, thickness and arc radius, of the strip can of course be matched to the requirements of the individual case, that is to say to the dimensions of the freewheel hub, in particular the clutch rings, to the properties of the cellular plastics material used, the desired spring forces, and the like.

In the first exemplary embodiment, the strip 34, which forms the spring arrangement 30, is bent by hand around an axis parallel to the thickness direction D of the strip 34 and placed into the retaining ring 40.

The retaining ring 40, which can best be seen in the exploded illustration in FIG. 3, comprises an annular base 42 and five retaining elements 44 protruding radially outwardly from said base.

Each of the retaining elements 44 has a substantially U-shaped form with an outer leg 43, a top surface 45 and an inner leg 47, which adjoins the base 42 and is connected thereto in one piece. The planar portions 36 of the strip 34 are placed and/or clamped into the receptacles 44*u* formed in this way, as a result of which the positions of the spring elements 32 are fixed relative to one another.

One of the retaining elements 44 additionally has an inner partition 49, against which the end faces 34*s* of the strip 34 can come to lie, this serving to facilitate the mounting. Additionally, it should be pointed out that the sectional plane in FIGS. 1 and 2 runs precisely through this partition 49, which can be readily seen in the bottom part of FIG. 2.

After the strip 34 is placed into the retaining ring 40, the cover ring 46 can be mounted on the retaining ring 40. For this purpose, in the present exemplary embodiment, corresponding projections 46*p*1 and 46*p*2 are provided on the cover ring 46 and matching recesses 44*r*1, 44*r*2 are provided on the retaining elements 44. In this respect, interference fits, conical fits (as in the case of 46*p*1 and 44*r*1) or else snap-fit connections are possible, for example. In the present exemplary embodiment, the cover ring 46 is in the form of a flat annular disc, which in addition to the structures for fastening to the retaining ring also has several rib structures 46*r* for increasing the rigidity.

When the preload device 28 is fully assembled, as shown in FIG. 4, the planar portions 36 of the spring arrangement 30 are received fixedly between the retaining ring 40 and the cover ring 46 and the preload device 28 can easily be handled as a replacement part. The risk that the strip 34 bends undesirably when being mounted on the hub sleeve 14 is minimized.

The retaining ring 40 and cover ring 46 may be produced from a suitable plastics material, for example by injection moulding.

In the assembled state of the freewheel hub 10, the convex side 32*bk* of each of the arcuate portions 32 presses against the first clutch ring 24 in the axial direction, in order to preload it towards the second clutch ring 26. The relatively large number and uniform distribution of the points of contact between the spring arrangement 30 and the first clutch ring 24 about the hub axle 12 makes it possible to apply the spring engagement uniformly to the clutch rings 24, 26. The spring strip is preferably configured such that only the flexural rigidity, and not the compression of the plastic, generates the spring forces required for the freewheel, the cellular structure not being significantly compressed during operation. It is assumed that the cellular structure reduces the flexural rigidity of the spring arrangement in a suitable way.

It is also possible to omit the cover ring 46, wherein in this case a simpler variant (not illustrated) of the retaining ring may be used, since the structures for fastening to the cover ring are not necessary in this case.

Figure 8:
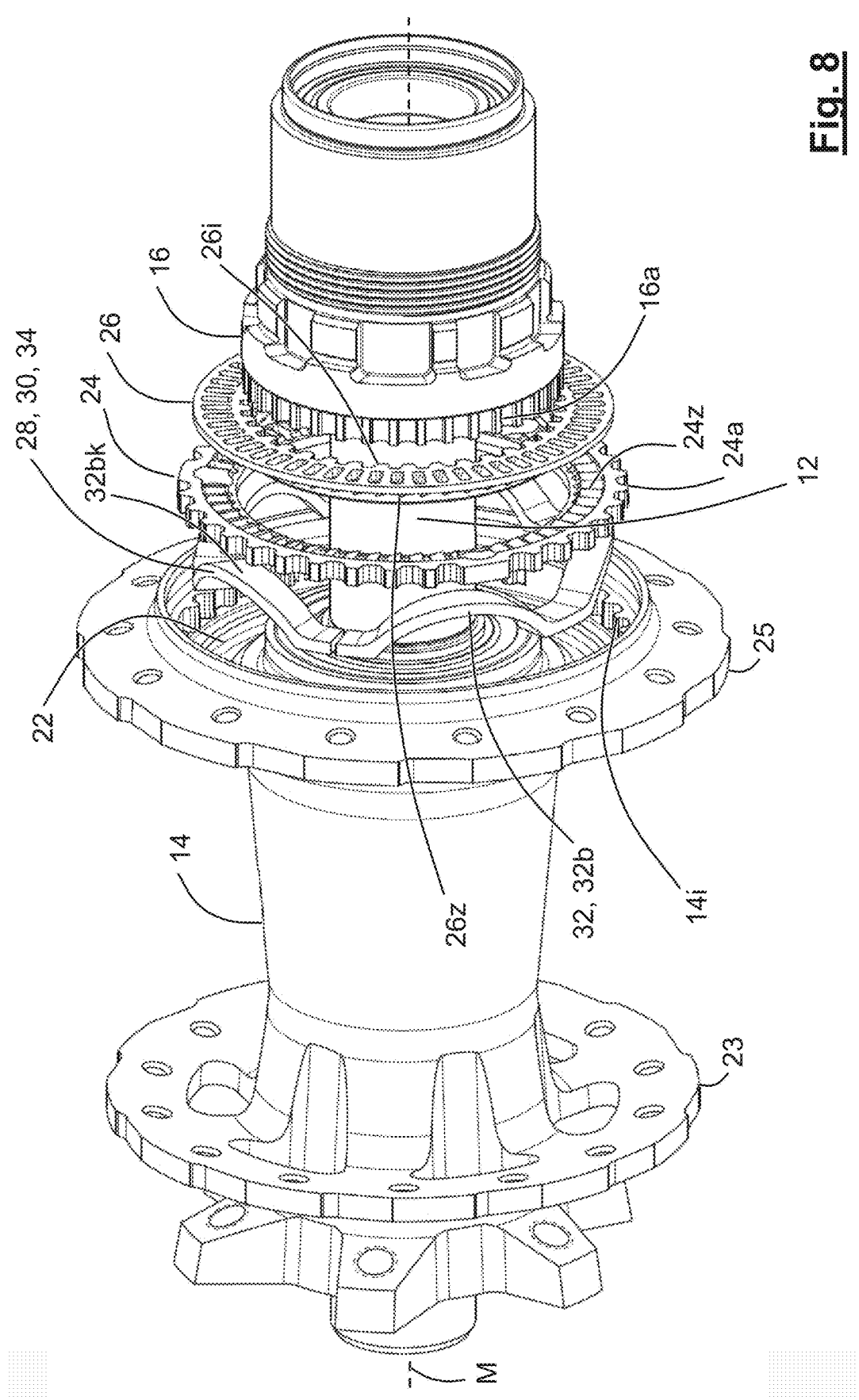
FIG. 8 shows an exploded illustration of essential components of a second exemplary embodiment of a freewheel hub.

It is also possible, but somewhat more demanding in terms of the mounting, to place only the strip 34 as a preload device 28 (that is to say without the retaining ring and cover ring) into the groove 22 of the hub sleeve 14, as shown in the second exemplary embodiment in FIG. 8.

Figure 9:
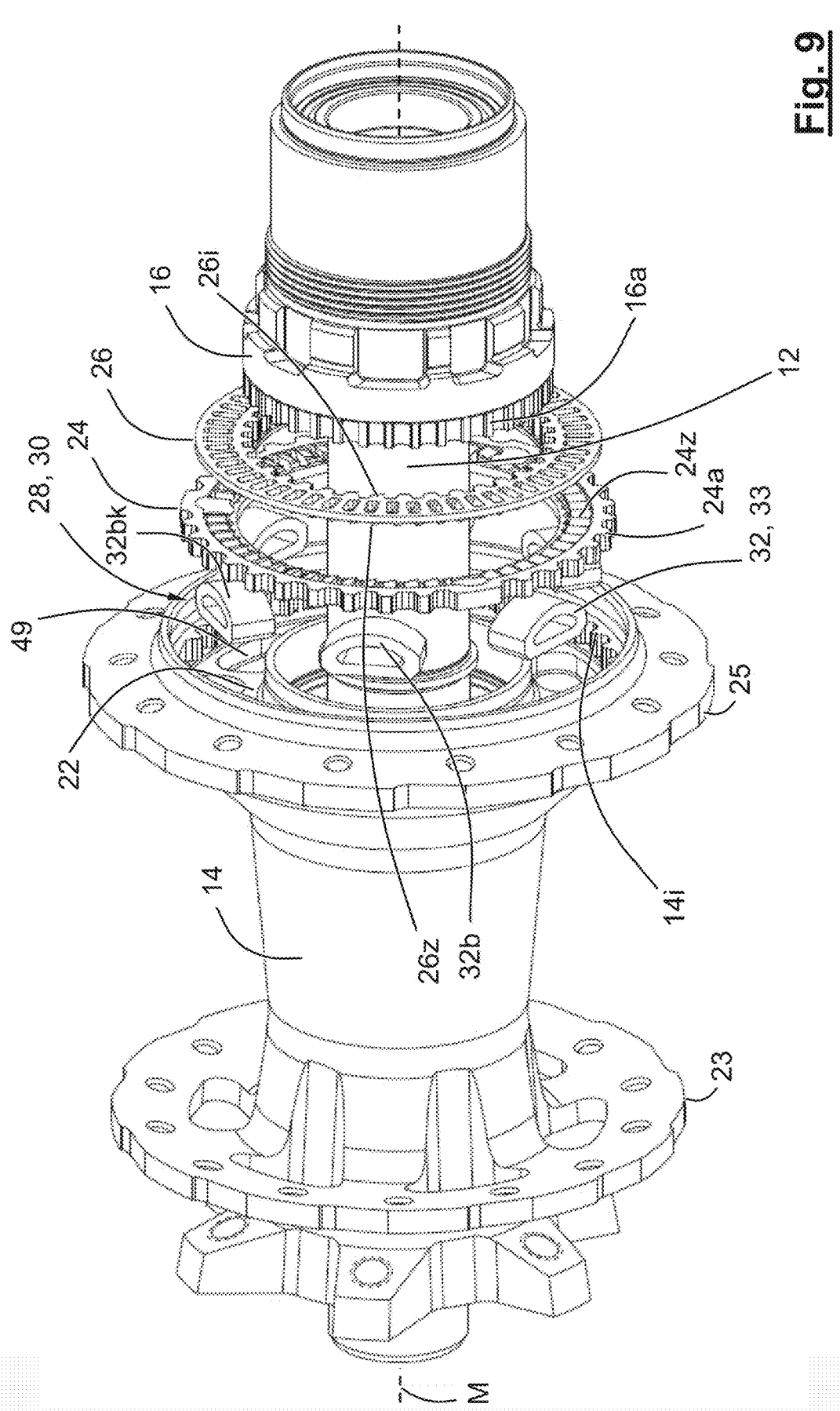
FIG. 9 shows an exploded illustration of essential components of a third exemplary embodiment of a freewheel hub.

For reasons of clarity, in each of the illustrations of the second and third exemplary embodiments in FIGS. 8 and 9, in particular the illustration of the closure element 31 (cf. FIG. 1) has been dispensed with.

Instead of a strip formed in one piece, it is also possible to use a plurality of separate spring elements 32, for instance in the form of separate D rings 33, as illustrated in the third exemplary embodiment in FIG. 9. Such D rings 33 may also be cut out of suitable foam sheets with low outlay. As an alternative, it would also be possible to use individual, separate spring elements, the appearance of which corresponds approximately to that in FIG. 7, each of which thus comprising a central arcuate portion and longitudinal ends which are angled away flatly.

In order that the individual spring elements 32 do not slip with respect to one another undesirably during operation of the freewheel 10, it may be provided that corresponding depressions 49 are provided in an axial surface of the hub sleeve 14, for example, into which depressions the spring elements 32 can be inserted or clamped, although this increases the machining outlay for the hub sleeve 14. As an alternative, it is also possible to use a suitably designed retaining ring for separate spring elements that fixes the spring elements in their relative position in relation to one another.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

I claim:

1. A freewheel hub for a bicycle, comprising:
a hub axle;
a hub sleeve which is mounted rotatably on the hub axle;
a driver which is mounted rotatably on the hub axle and can be connected to at least one sprocket arrangement; and
a freewheel device arranged between the hub sleeve and the driver, comprising:
   a first clutch ring, which is coupled or couplable to the hub sleeve in a torque-transmitting manner,
   a second clutch ring, which is coupled or couplable to the driver in a torque-transmitting manner,
wherein the first clutch ring and the second clutch ring have mutually facing axial toothings, and a single preload device which is arranged to preload, in a single axial direction, the two clutch rings axially towards one another, wherein the single preload device has a spring arrangement with at least one spring element that includes a plastic with a cellular structure, the spring element having an arcuate portion, the convex side of which is configured to press against one of the clutch rings in the single axial direction in order to preload the two clutch rings against one another.

2. The freewheel hub according to claim 1, wherein the spring element includes a polyurethane-based plastic.

3. The freewheel hub according to claim 1, wherein the spring arrangement includes a plurality of spring elements.

4. The freewheel hub according to claim 1, wherein the plurality of spring elements are of a same type and are arranged distributed around the circumference of the hub axle.

5. The freewheel hub according to claim 1, wherein the arcuate portion is in the form of a strip portion with substantially constant width and thickness.

6. The freewheel hub according to claim 1, wherein the spring arrangement is configured such that, although the spring arrangement is deformed when a contact pressure of 0.2 N to 0.5 N is applied to the spring arrangement in the axial direction, the cellular structure of the plastic is not compressed.

7. The freewheel hub according to claim 1, further comprising a plurality of separately formed spring elements of a same type, which together form the spring arrangement.

8. The freewheel hub according to claim 7, wherein each spring element is in the form of a D ring or formed in the shape of an arc with angled-away longitudinal ends.

9. The freewheel hub according to claim 7, wherein the spring elements are inserted into corresponding depressions formed in an axial surface of the hub sleeve or an axial surface of the driver.

10. The freewheel hub according to claim 1, having a plurality of spring elements of the same type, which are connected to one another in one piece and preferably in the form of a cohesive strip which forms the spring arrangement.

11. The freewheel hub according to claim 10, wherein the plurality of spring elements are distributed around the hub axle in the circumferential direction, wherein the preload device also has a retaining ring, which is designed to fix the positions of the spring elements relative to one another.

12. The freewheel hub according to claim 11, wherein the retaining ring comprises an annular base and a plurality of retaining elements which are distributed around the circumference of the base, protrude radially from said base, cover the spring arrangement axially on one side in certain portions and preferably engage around the spring arrangement radially from the inside and outside.

13. The freewheel hub according to claim 12, wherein the preload device also comprises a cover ring, which can be mounted on the retaining ring such that the spring arrangement is received at least in certain portions between the retaining ring and the cover ring and, together with the retaining ring and the cover ring, forms a solidly cohesive assembly.

14. A preload device for a freewheel hub, comprising:
a spring arrangement with at least one spring element, wherein the at least one spring element includes a plastic with a cellular structure, and wherein the spring arrangement is arranged to preload, in a single axial direction, two clutch rings axially towards one another.

* * * * *